US008029170B2

(12) United States Patent
Lee

(10) Patent No.: US 8,029,170 B2
(45) Date of Patent: Oct. 4, 2011

(54) LAMP WITH LIGHT EMITTING DIODES USING ALTERNATING CURRENT

(75) Inventor: Choong Hae Lee, Seoul (KR)

(73) Assignee: Gwangsung Electric Industry Co., Ltd., Incheon (KR)

(*) Notice: Subject to any disclaimer, the term of this patent is extended or adjusted under 35 U.S.C. 154(b) by 36 days.

(21) Appl. No.: 12/530,203

(22) PCT Filed: Mar. 4, 2008

(86) PCT No.: PCT/KR2008/001226

§ 371 (c)(1), (2), (4) Date: Sep. 5, 2009

(87) PCT Pub. No.: WO2008/108574

PCT Pub. Date: Sep. 12, 2008

(65) Prior Publication Data

US 2010/0103679 A1 Apr. 29, 2010

(30) Foreign Application Priority Data

Mar. 6, 2007 (KR) .................... 20-2007-0003641 U

(51) Int. Cl.
*B60Q 1/06* (2006.01)
*F21V 29/00* (2006.01)

(52) U.S. Cl. .................... 362/373; 362/294; 362/296.01

(58) Field of Classification Search .................. 362/294, 362/257, 296.01, 307, 310, 311.02, 329, 362/507, 510, 519, 540, 541, 542, 543, 544, 362/547, 548, 549, 296, 341, 347, 373, 345
See application file for complete search history.

(56) References Cited

U.S. PATENT DOCUMENTS

| | | | | |
|---|---|---|---|---|
| 1,848,812 | A * | 3/1932 | Wiley | 362/208 |
| 4,885,668 | A * | 12/1989 | Maglica et al. | 362/345 |
| 5,404,281 | A * | 4/1995 | Parker | 362/208 |
| 5,739,639 | A * | 4/1998 | Johnson | 315/86 |
| 5,785,418 | A * | 7/1998 | Hochstein | 362/373 |
| 5,857,767 | A * | 1/1999 | Hochstein | 362/294 |
| 7,357,534 | B2 * | 4/2008 | Snyder | 362/294 |
| 7,549,773 | B2 * | 6/2009 | Lim | 362/294 |
| 2002/0176250 | A1 * | 11/2002 | Bohler et al. | 362/236 |
| 2003/0156416 | A1 * | 8/2003 | Stopa et al. | 362/294 |
| 2004/0223327 | A1 * | 11/2004 | Kuan et al. | 362/249 |
| 2005/0174780 | A1 * | 8/2005 | Park | 362/294 |

FOREIGN PATENT DOCUMENTS

| | | |
|---|---|---|
| KR | 2004-0037523 A | 5/2004 |
| KR | 0643597 | 11/2006 |
| KR | 0646637 | 11/2006 |
| KR | 0646638 | 11/2006 |
| KR | 0664349 | 1/2007 |
| WO | WO-2005/013366 A1 | 2/2005 |

* cited by examiner

*Primary Examiner* — Anabel Ton
*Assistant Examiner* — Danielle Allen
(74) *Attorney, Agent, or Firm* — Rabin & Berdo, P.C.

(57) ABSTRACT

Provided is an LED lamp for AC power. The LED lamp for the AC power can replace a related art halogen lamp. Since the bottom of an LED substrate for AC power is allowed to directly contact an inner upper surface serving as a substrate base of a main body with a built-in heatsink where heatsink pins are formed in an entire outer peripheral surface, so that heatsink operation of heat generated while the LED for the AC power operates is maximized. A reflection funnel whose inner surface is entirely chrome-deposited extends on the upper end of the main body with the built-in heatsink to reflect light while the LED for the AC power is lit, so that the intensity of illumination can be enhanced.

6 Claims, 2 Drawing Sheets

LAMP WITH LIGHT EMITTING DIODES USING ALTERNATING CURRENT

BACKGROUND OF THE INVENTION

1. Field of the Invention

The present invention relates to a lamp, and more particularly, to a light emitting diode (LED) lamp for alternating current (AC) power that can replace a halogen lamp widely used for local lighting.

2. Description of the Related Art

A halogen lamp wieldy used for local lighting in general is used for lighting local places such as an exhibition hall, a store, a display stand, and a worktable at high intensity of illumination.

FIG. 1 is a view illustrating an embodiment of a mirror type halogen lamp of a related art widely used for local lighting and also called a multi-mirrored reflector (MR) lamp or a dichroic halogen lamp. The halogen lamp 10 includes a glass sphere 13, an insulating member 14, and a mirror 16. A halogen gas is injected into the glass sphere 13, and an electrode terminal 12 is connected to a filament 11 inside the glass sphere 13 and protrudes to the outside of the lower end of the glass sphere 13. The insulating member 14 surrounds the lower end of the glass sphere 13. The mirror 16 surrounds the insulating member 14 and reflects light emitted from the glass sphere 13. The upper opening of the mirror 16 is covered by a cap 15.

Like a general incandescent electric lamp, the mirror type halogen lamp having the above construction emits light generated by emission of the filament 11. The mirror 16 refracts or concentrates light emitted from the glass sphere 13 to reflect the light, thereby enhancing the intensity of illumination and making spot-lighting possible.

The halogen gas inside the glass sphere 13 prevents tungsten particles of the filament 11 from evaporating and being deposited inside the glass sphere 13, and repeats a halogen cycle of combining with an evaporating tungsten particle to put the tungsten particle back onto the filament 11, thereby extending life of the lamp and maintaining uniform brightness.

SUMMARY OF THE INVENTION

Meanwhile, a separate stabilizer converting a general power of 220 V into a power of 12 V should be additionally used to light up a related art halogen lamp operating in the above described manner. Particularly, since the filament 11 is used as in the incandescent electric lamp, a large amount of heat is generated and life is short.

An object of the present invention is to provide an LED lamp for AC power that can replace a related art halogen lamp, and allow the bottom of an LED substrate for AC power including the LED for AC power to directly contact an inner upper surface serving as a substrate base of a main body with a built-in heatsink where heatsink pins are formed in an entire outer peripheral surface to maximize heatsink operation of heat generated while the LED for the AC power operates.

Another object of the present invention is to provide an LED lamp for AC power that allows a reflection funnel whose inner surface is entirely chrome-deposited to extend from the upper end of a main body with a built-in heatsink where heatsink pins are formed in an entire outer peripheral surface while serving as the substrate base to reflect light during a lighting operation of the LED of the AC power, thereby enhancing the intensity of illumination.

According to an embodiment of the present invention, there is provided an LED lamp for AC power, the LED lamp including: an LED substrate for AC power on which at least one LED for AC power is mounted; a main body with a built-in heatsink, where a bottom of the LED substrate for the AC power adheres to an upper surface of a thermal conductive tape attached on an inner upper surface serving as a substrate base, a reflection funnel whose inner surface is entirely chrome-deposited extends from an upper end, a power connection hole passing through an inside, into which a power connection unit applying power to the LED substrate for the AC power is inserted is formed, and heatsink pins are formed in an entire outer peripheral surface; and a cap covering an opening of the reflection funnel of the main body with the built-in heatsink.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, embodiments of the present invention will be described in detail with reference to the accompanying drawings.

Figure 2:
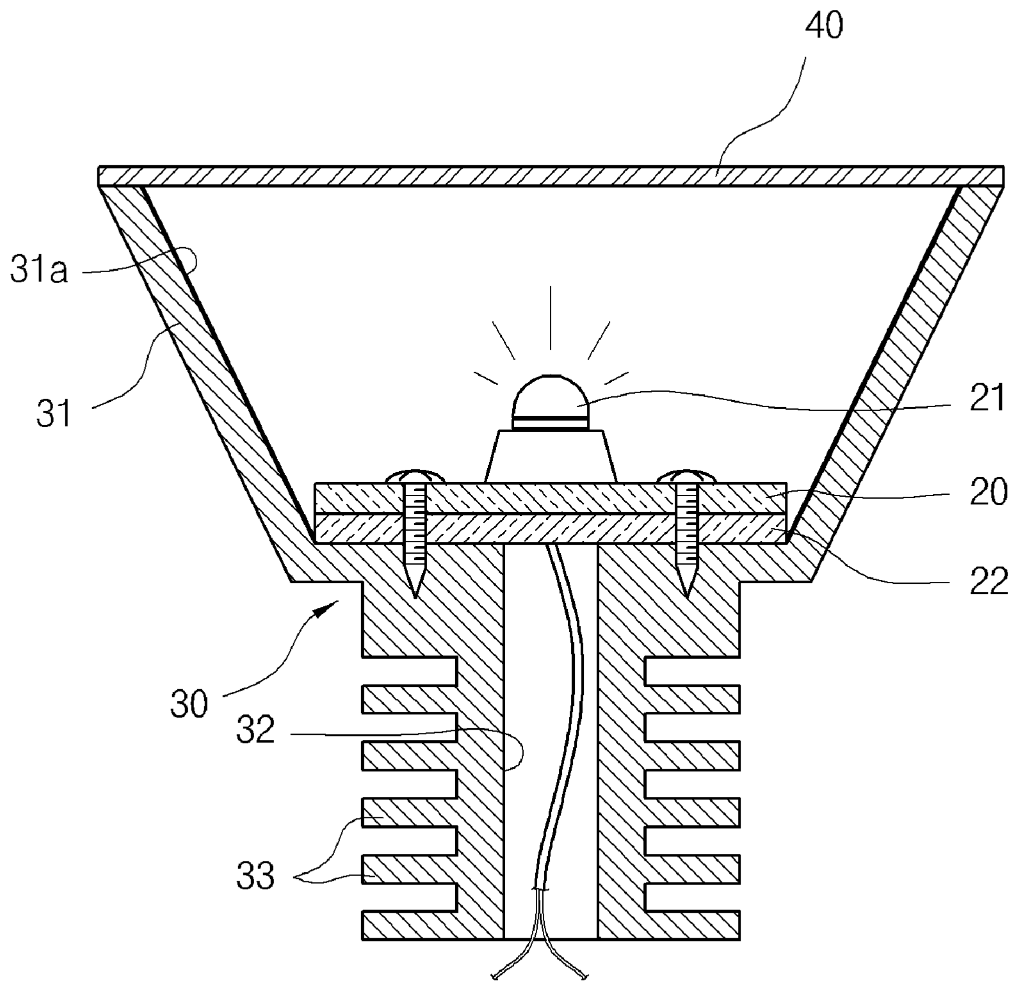
FIG. 2 is a view illustrating an embodiment of an LED lamp for AC power according to the present invention.

Referring to FIG. 2, at least one LED 21 for AC power is mounted on an LED substrate 20 for AC power, which adheres to a main body 30 with a built-in heatsink.

The LED substrate 20 for AC power is a metal printed circuit board (PCB) formed of an aluminum alloy. The at least one LED 21 for AC power is mounted on the LED substrate 20, and a thermal conductive tape 22 is attached on the bottom of the LED substrate 20.

The LED substrate 20 for AC power is fixed on the upper surface of the main body 30 with the built-in heatsink using a separate fixing member such as a screw.

The main body 30 with the built-in heatsink is formed of aluminum. The bottom of the LED substrate 20 for the AC power adheres to an upper surface of the adhesive thermal conductive tape 22 attached on an inner upper surface serving as a substrate base, a reflection funnel 31 having a reflection layer 31*a* whose inner surface is entirely chrome-deposited extends from an upper end, a power connection hole 32 passing through an inside, into which a power connection unit applying power to the LED substrate 20 for the AC power is formed, and heatsink pins 33 are formed in an entire outer peripheral surface.

The thermal conductive tape 22 is a double-sided adhesive thermal conductive tape formed of graphite relatively cheap compared to aluminum and having excellent thermal conductivity and thermal resistance like aluminum.

The inner surface of the power connection hole 32 may be processed to have heat-resisting property and insulating property, so that heat radiated from the LED substrate 20 for AC power to the heatsinks 33 of the main body 30 with the built-in heatsink is prevented from being transferred to the power connection unit.

The power connection unit can be a general electric cord or a lead line, or an electrode terminal including the electric cord or the lead line.

The cap 40 covers the opening of the reflection funnel 31 of the main body 30 with the built-in heatsink, and may be formed of glass or acryl.

The LED lamp for the AC power having the above construction according to the present invention operates in the following way.

While the at least one LED 21 for the AC power on the LED substrate 20 for the AC power is lit by AC power supplied through the power connection unit inserted into the power connection hole 32, heat generated from the LED substrate 20 for the AC power whose bottom adheres to the inner upper surface of the main body with the built-in heatsink serving as a substrate base is radiated to the outside through two paths.

First, a portion of heat generated from the LED substrate 20 for the AC power is directly conducted to the reflection funnel 31 covering the neighborhood of the upper end of the LED substrate 20 for the AC power and radiated to the outside.

Second, another portion of the heat generated from the LED substrate 20 for the AC power is directly conducted to the upper surface of the main body 30 with the built-in heatsink contacting the bottom of the LED substrate 20 for the AC power via the bottom of the LED substrate 20 for the AC power and the graphite thermal conductive tape 22, and radiated to the outside through the heatsink pins 33 formed in the entire peripheral surface of the main body 30 with the built-in heatsink. Actually, most (for example, about 90% or more) of heat generated while the LED 21 for the AC power is lit is radiated to the outside through the bottom of the LED substrate 20.

When heat is conducted by allowing the bottom of the LED substrate 20 for the AC power to directly contact the main body 30 with the built-in heatsink where heatsink pins 33 are formed in the entire outer peripheral surface, heatsink efficiency of heat generated while the LED 21 for the AC power is lit can be maximized. Accordingly, overheating of the LED lamp for the AC power according to the present invention can be prevented.

Meanwhile, since light generated while the LED 21 for the AC power is lit is reflected by the chrome-coated reflection layer 31*a* of the reflection funnel 31, the intensity of illumination of the LED 21 for the AC power can be enhanced.

Figure 1:
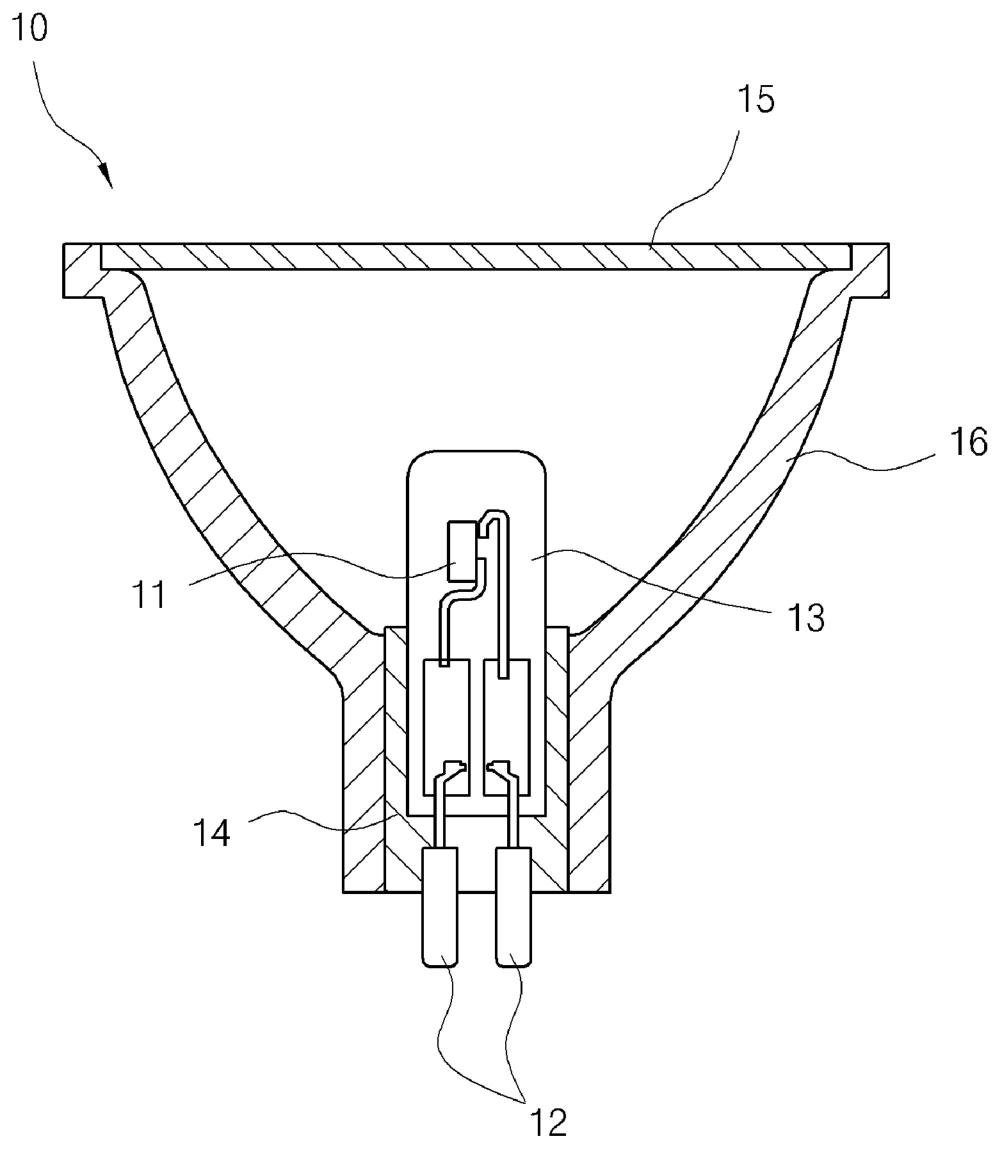
FIG. 1 is a view illustrating an embodiment of a mirror type halogen lamp according to a related art.

For reference, the present inventor has measured temperature and an amount of light under same condition with respect to the LED lamp for the AC power according to the present invention and the halogen lamp 10 according to the related art illustrated in FIG. 1. The measurement showed differences as illustrated in Table 1.

TABLE 1

| Measurement item | Halogen lamp according to the related art | LED lamp according to the present invention |
|---|---|---|
| Temperature | 100° C. | 80° C. or less |
| Amount of light | 80% of reference amount of light | 90% or more of reference amount of light |

Referring to Table 1, heatsink operation of the present invention improves compared to that of the halogen lamp, and the amount of light according to the present invention is greater than that of the halogen lamp.

The LED lamp for the AC power according to the present invention can replace a related art halogen lamp and allows the bottom of the LED substrate for the AC power to directly contact the inner upper surface serving as a substrate base of the main body with the built-in heatsink where heatsink pins are formed in an entire outer peripheral surface, so that heatsink operation of heat generated while the LED for the AC power operates can be maximized.

Additionally, the reflection funnel whose inner surface is entirely chrome-deposited extends from the upper end of the main body with the built-in heatsink to reflect light while the LED for the AC power operates, so that the intensity of illumination of the lamp can be enhanced.

The above-described LED lamp for the AC power according to the present invention is not limited to the embodiment but those skilled in the art will appreciate that various modifications, additions and substitutions can be made without departing from the scope and spirit of the invention as defined in the accompanying claims.

What is claimed is:

1. A light emitting diode (LED) lamp for alternating current (AC) power, the LED lamp comprising:
- at least one LED that operates in AC power;
- a metal printed circuit board (PCB) formed of an aluminum alloy, the PCB being an LED substrate for AC power on which said at least one LED operating in AC power is mounted;
- a main body with a built-in heatsink formed of aluminum, where a bottom of the LED substrate for the AC power adheres to an upper surface of a double-sided adhesive thermal conductive tape attached on an inner upper surface serving as a substrate base and formed of graphite, a reflection funnel having a reflection layer whose inner surface is entirely chrome-deposited extends from an upper end, a power connection hole passing through an inside, into which a power connection unit applying power to the LED substrate for the AC power is inserted is formed, and heatsink pins are formed in an entire outer peripheral surface; and
- a cap covering an opening of the reflection funnel of the main body with the built-in heatsink,
- wherein an entire side surface of the LED substrate is surrounded by the reflection funnel.

2. The LED lamp of claim 1, wherein the LED substrate for the AC power is fixed on the inner upper surface of the main body with the built-in heatsink using a separate fixing unit.

3. The LED lamp of claim 1, wherein the cap is formed of one of glass and acryl.

4. The LED lamp of claim 1, wherein the main body is formed as a unitary shape which has a first region including the heatsink pins and a second region including the reflection funnel, and the second region continuously extends from the first region without being connected to the first region by using a fastener.

5. The LED lamp of claim 1, wherein a top surface of the LED substrate is not in contact with the reflection funnel.

6. The LED lamp of claim 1, wherein the reflection funnel is not disposed directly above a top surface of the LED substrate.

* * * * *